Nov. 28, 1944.  A. B. MACHADO  2,363,737
CALCULATING MACHINE
Filed April 8, 1941  9 Sheets-Sheet 1
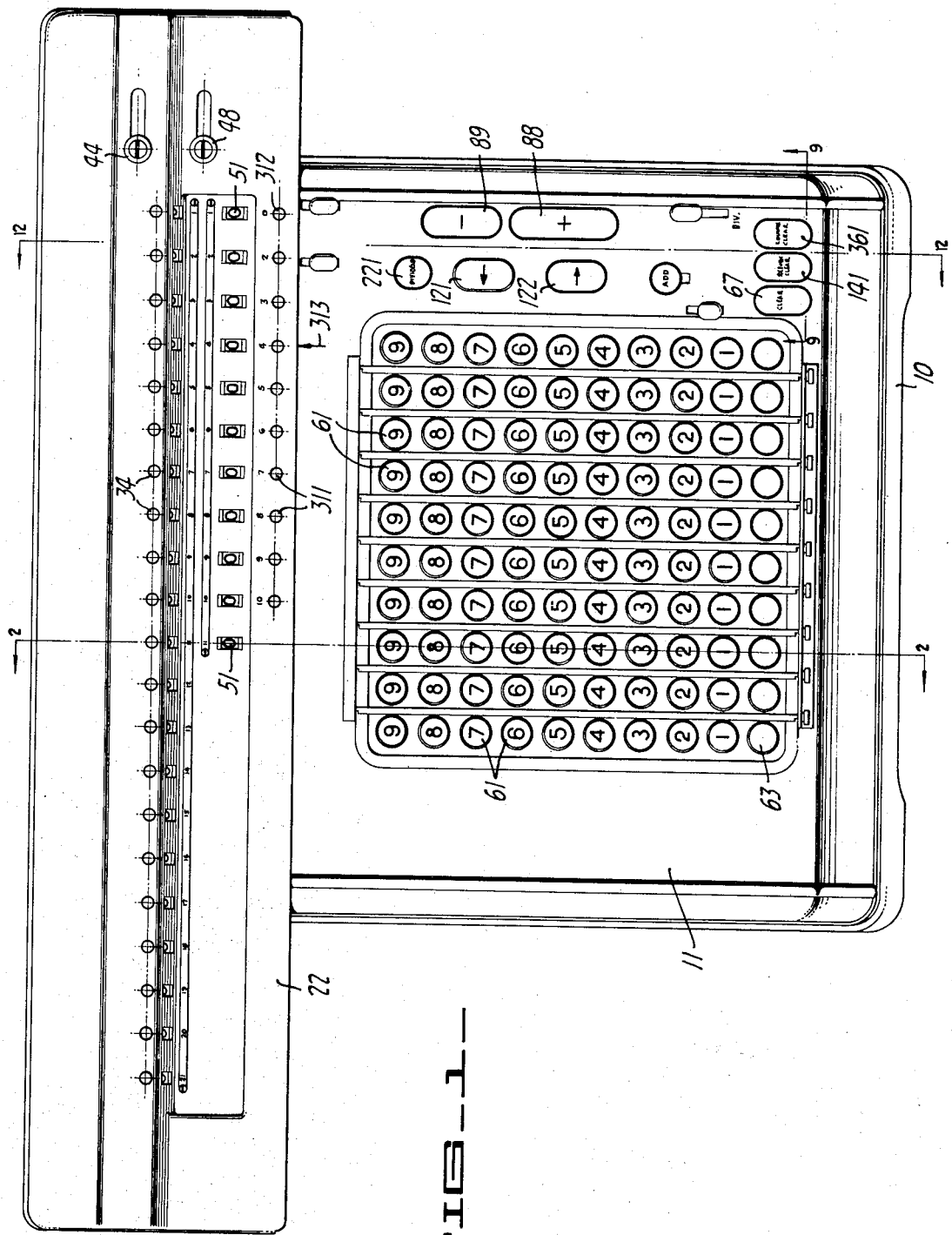
FIG_1_
INVENTOR
Anthony B. Machado
BY Harper Allen
ATTORNEY Nov. 28, 1944. A. B. MACHADO 2,363,737
CALCULATING MACHINE
Filed April 8, 1941 9 Sheets-Sheet 2
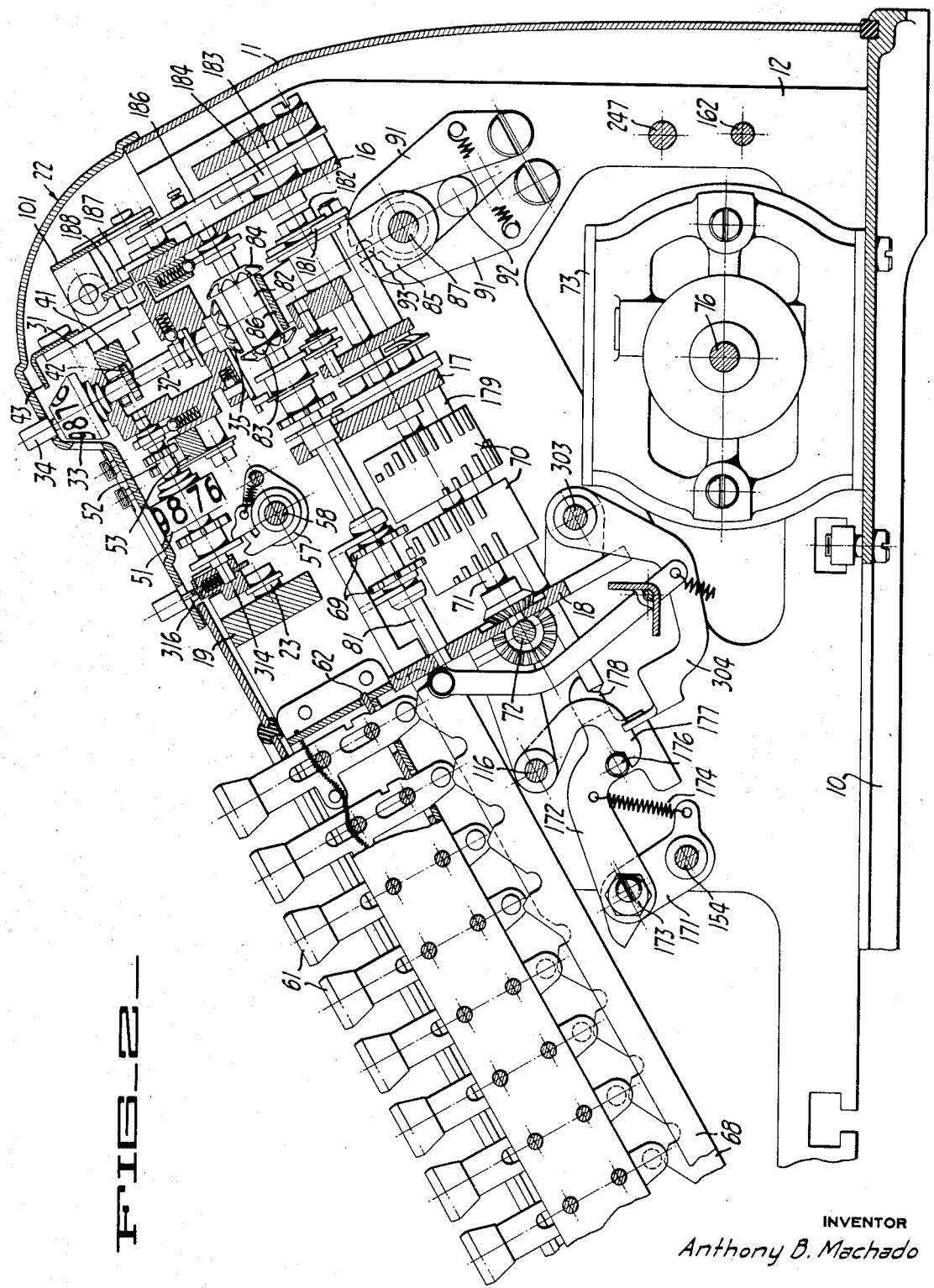
FIG_2_
INVENTOR
Anthony B. Machado
BY Harper Allen
ATTORNEY

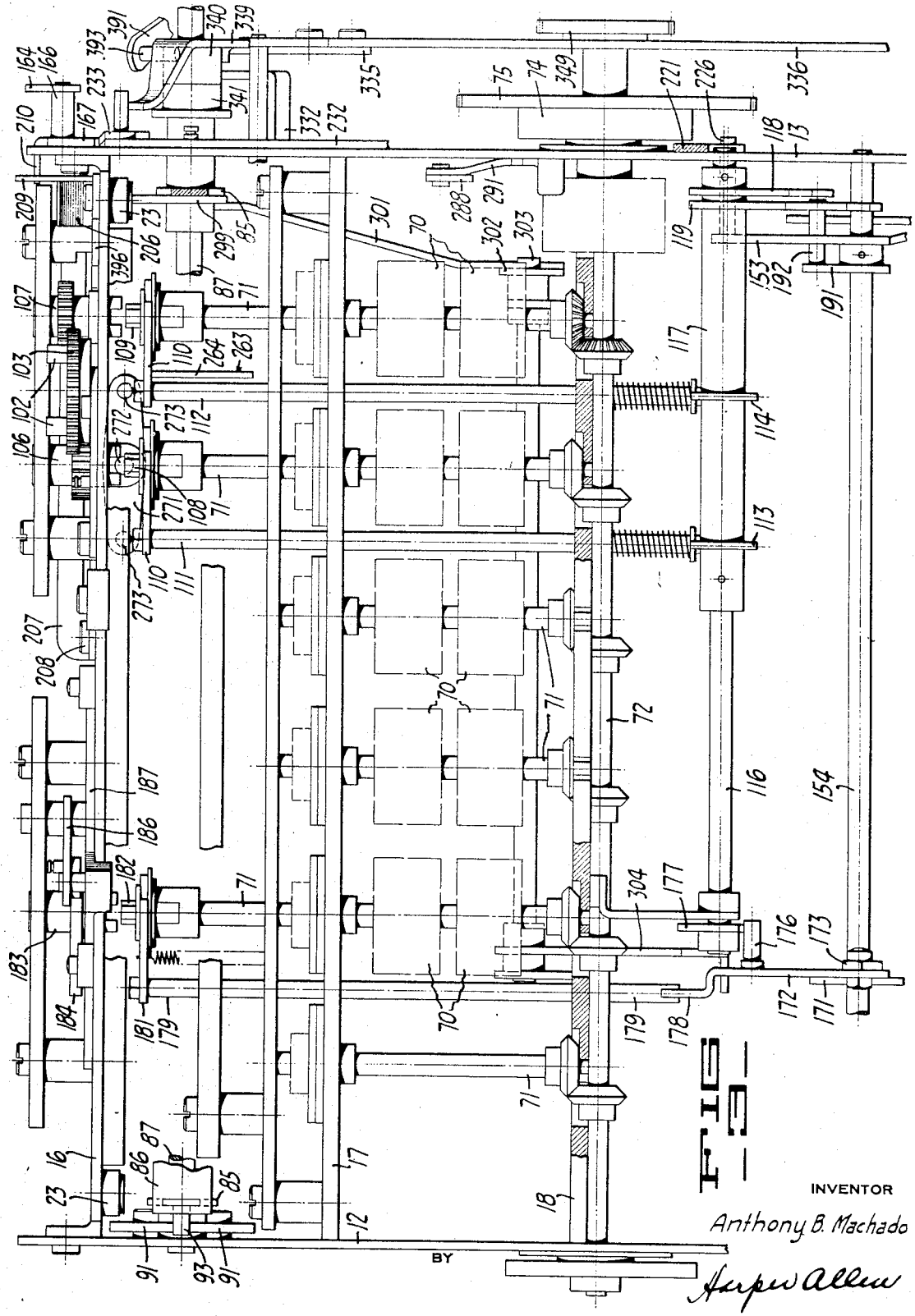

Nov. 28, 1944.　　　A. B. MACHADO　　　2,363,737
CALCULATING MACHINE
Filed April 8, 1941　　　9 Sheets-Sheet 4
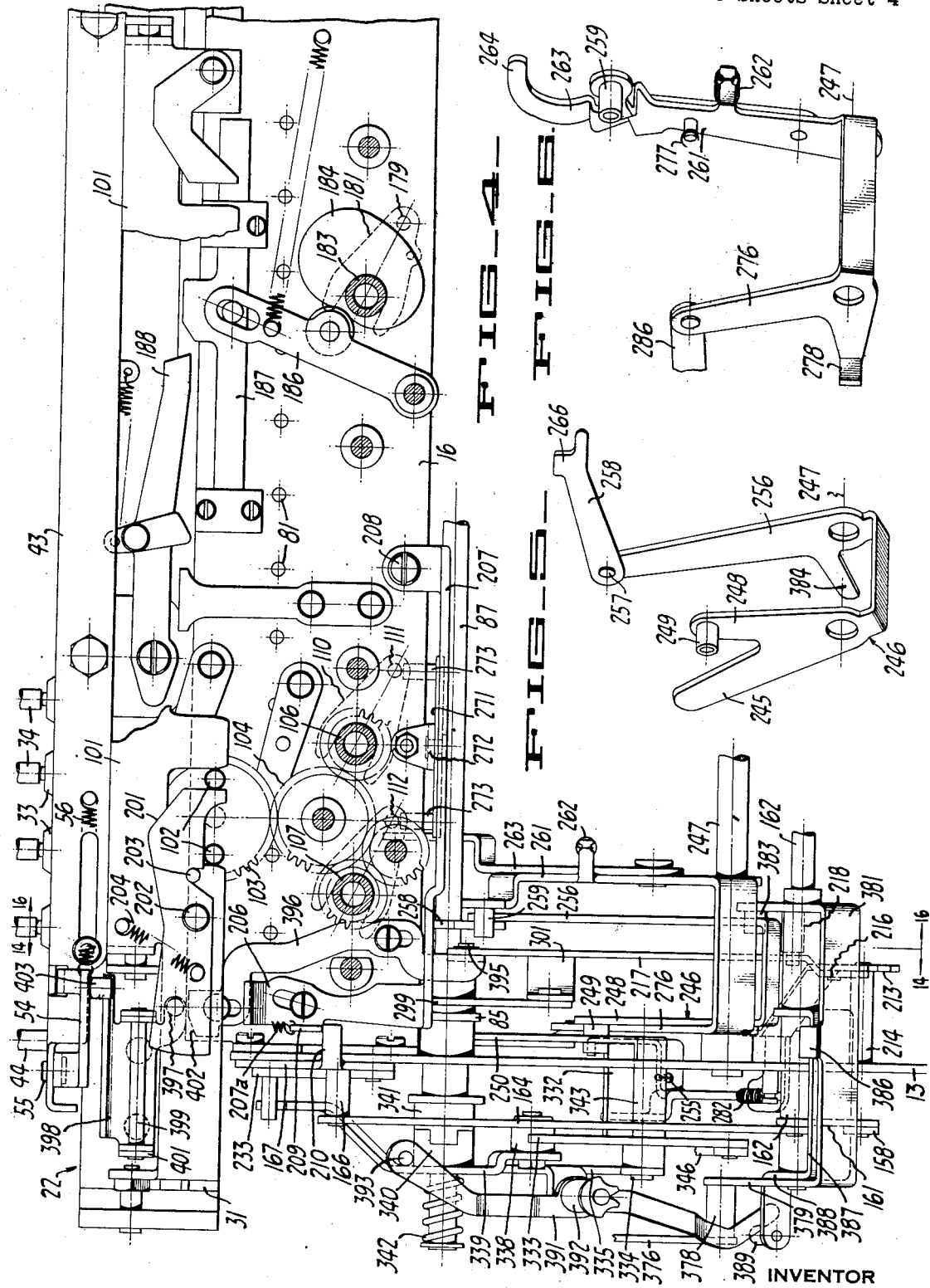
INVENTOR
*Anthony B. Machado*
BY *Harper Allen*
ATTORNEY Nov. 28, 1944.   A. B. MACHADO   2,363,737
CALCULATING MACHINE
Filed April 8, 1941   9 Sheets-Sheet 5
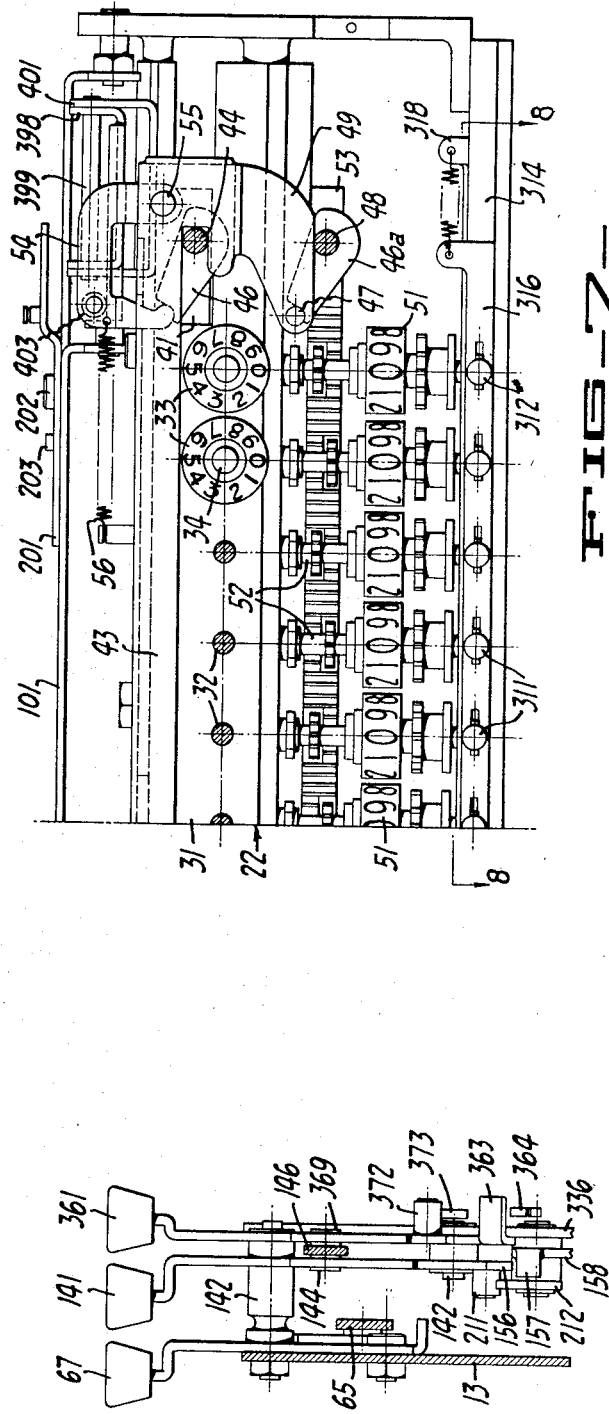
FIG_7_
FIG_8_
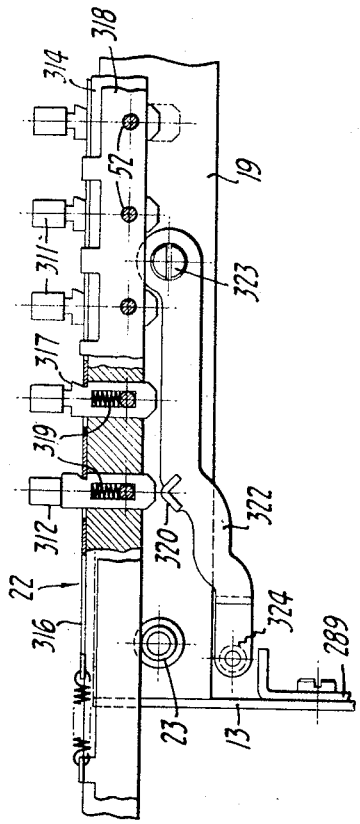
FIG_9_
INVENTOR
Anthony B. Machado
BY Harper Allen
ATTORNEY

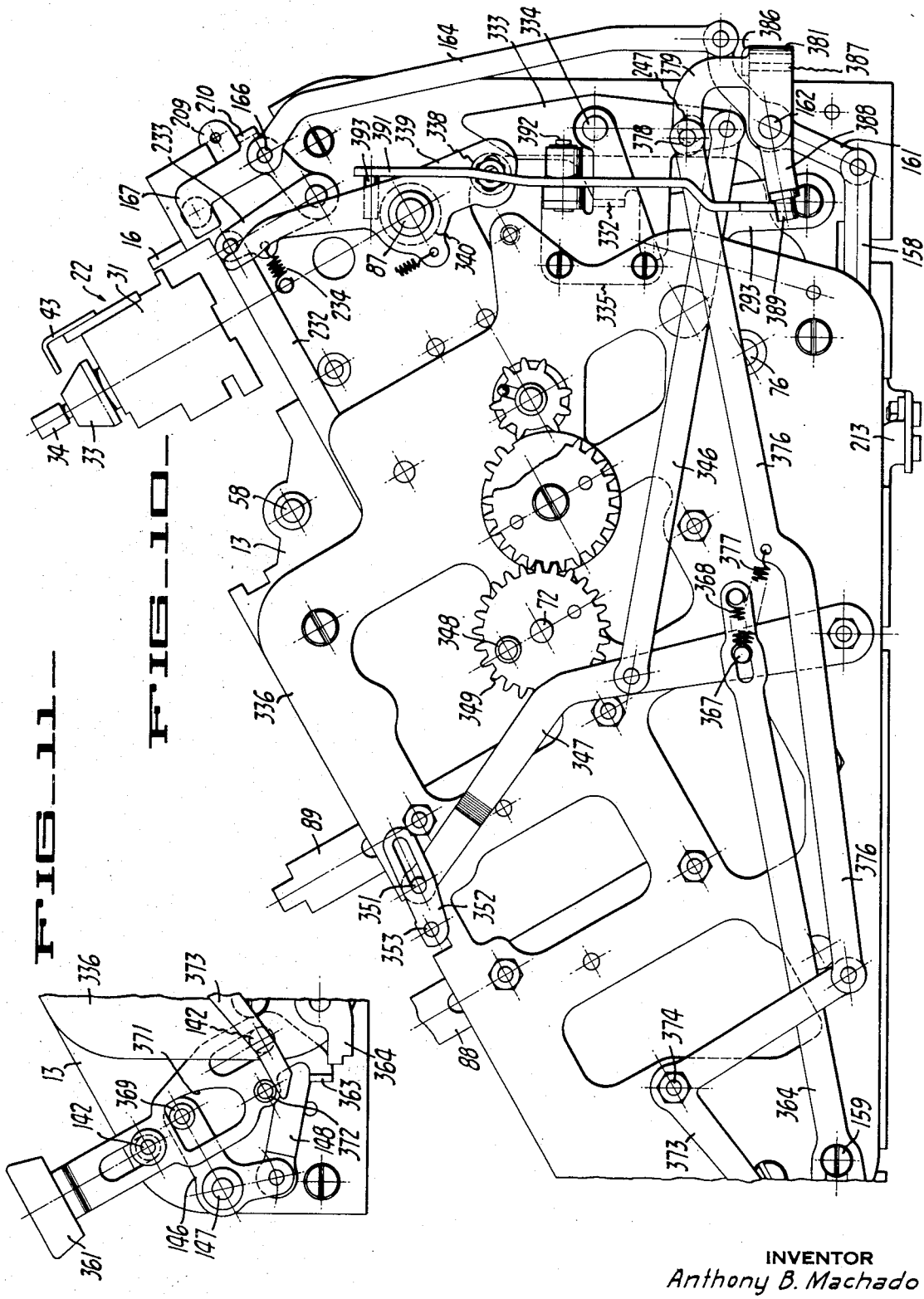

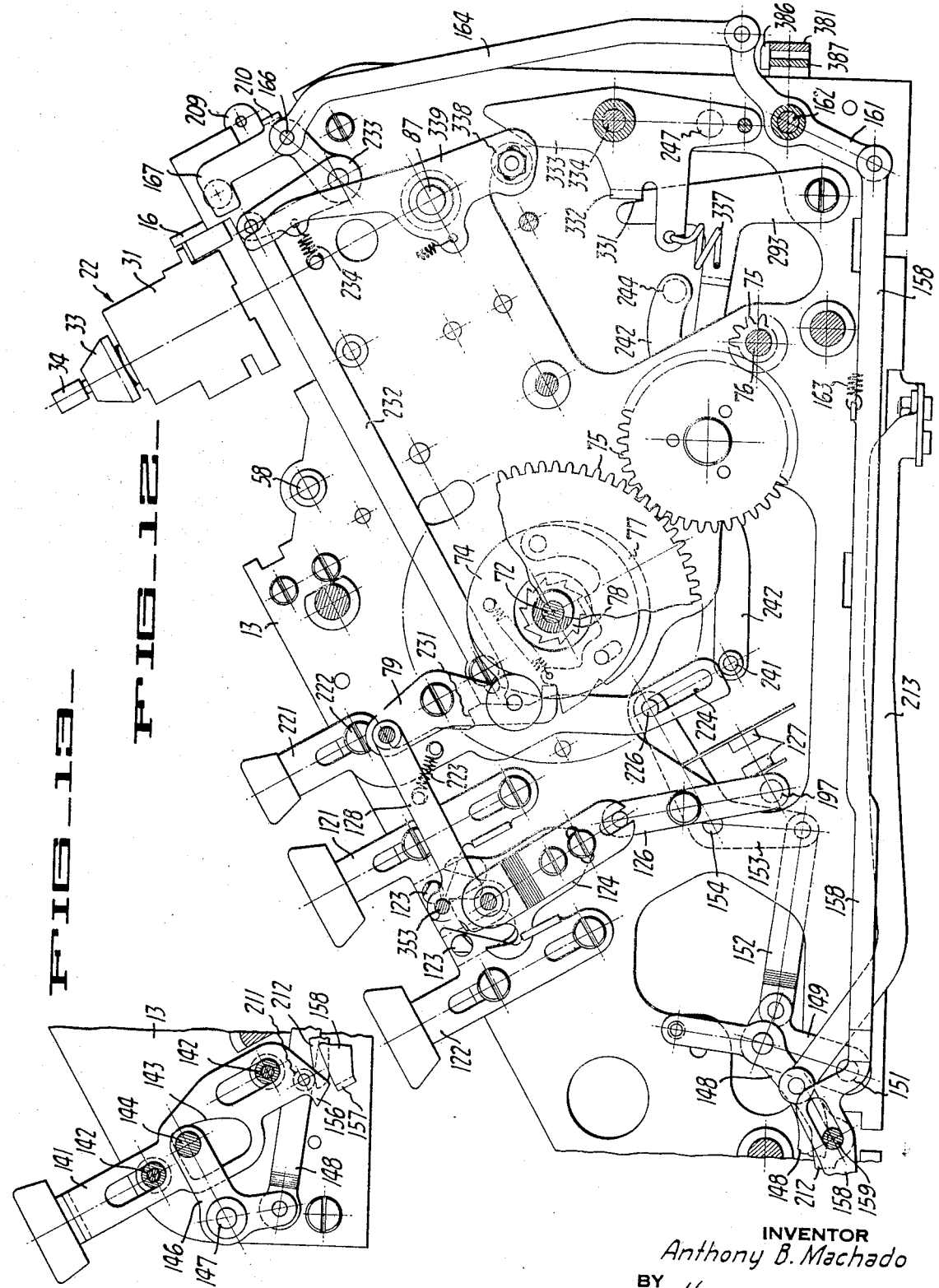

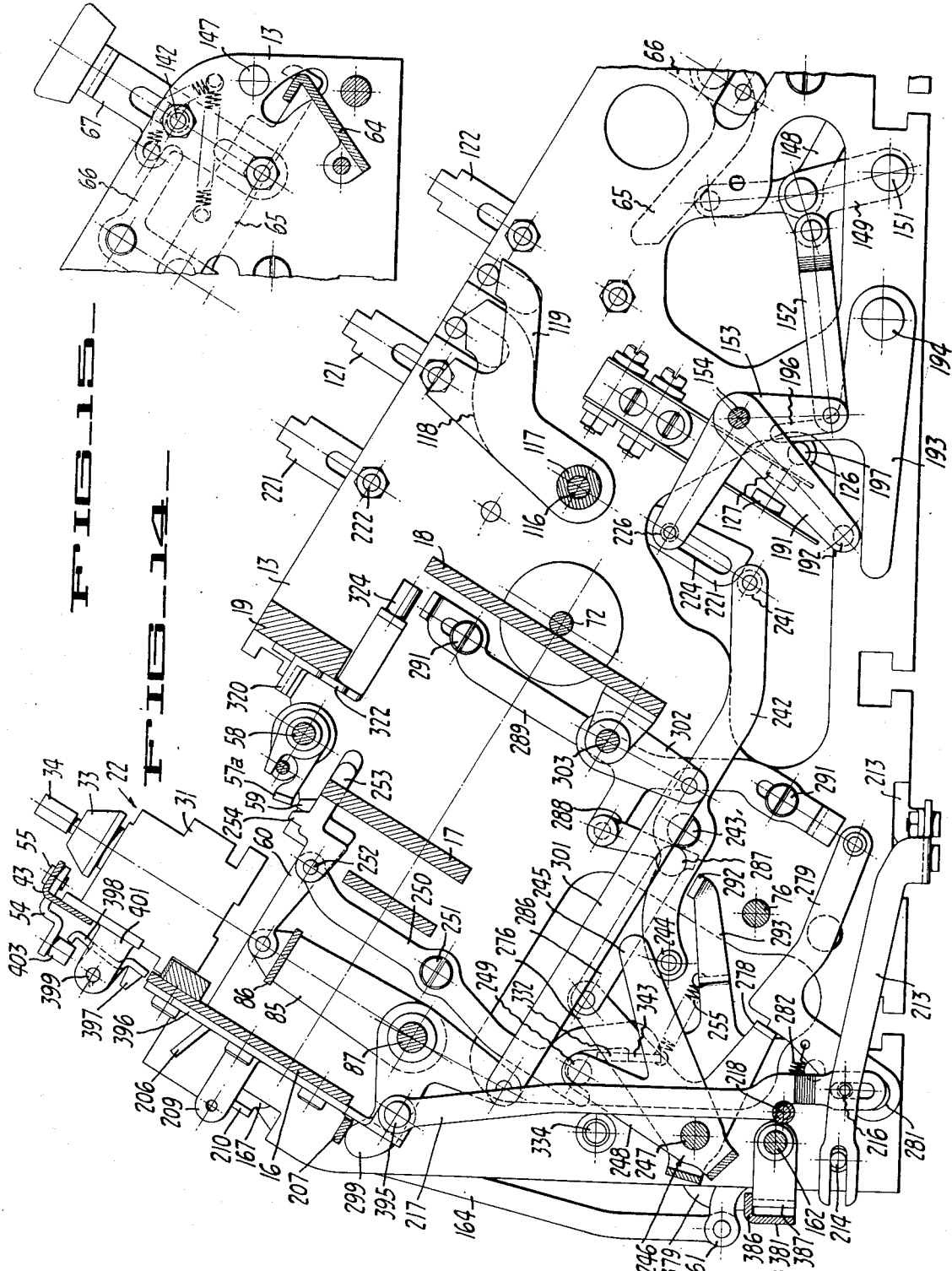

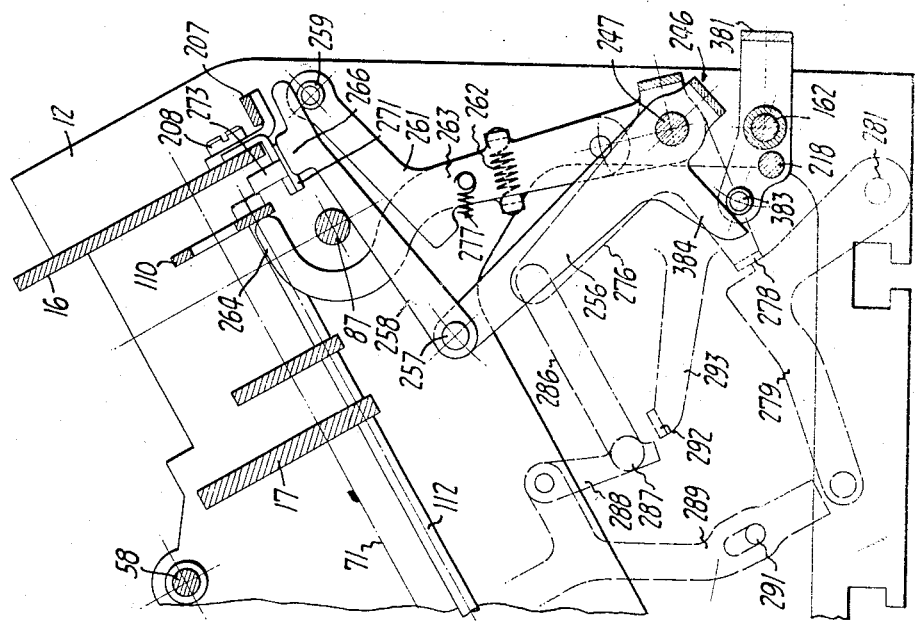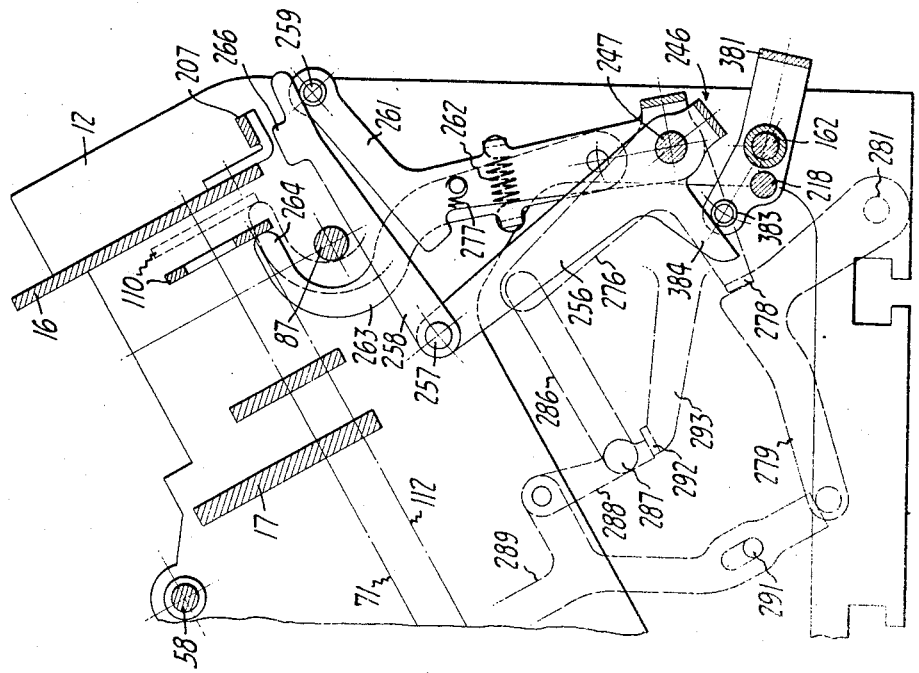

Patented Nov. 28, 1944

2,363,737

UNITED STATES PATENT OFFICE 2,363,737

CALCULATING MACHINE

Anthony B. Machado, Oakland, Calif., assignor to Friden Calculating Machine Co., Inc., a corporation of California Application April 8, 1941, Serial No. 387,408

10 Claims. (Cl. 235—63)

This invention relates to calculating machines and is concerned more particularly with the provision of improved means for controlling the clearing of the registers and positioning of the carriage in a selected tabulated position simultaneously with the clearing operation.

It is a general object of the invention to provide a calculating machine having improved clearing and tabulating mechanism for the registers thereof.

Another object of the invention is to provide a machine of the character described in which the carriage can be returned to a selected ordinal position incident to each clearing operation and in which the clearing operations can be performed on the counter alone in response to depression of the appropriate control key.

Another object of the invention is to provide a calculating machine having selectively operable control means by operation of which the carriage can be positioned in a selected tabulated position with one or both of the registers reset to zero as may be selected.

Other objects of the invention will be apparent from the following description of a preferred embodiment thereof as illustrated in the accompanying drawings, in which:

Figure 1 is a plan view of a calculating machine embodying the instant invention;

Figure 2 is a vertical sectional view through the calculating machine taken in a plane indicated by the line 2—2 in Figure 1;

Figure 3 is a plan view with the keyboard and carriage removed and other parts shown schematically for a clearer illustration of the parts shown;

Figure 4 is a fragmentary, rear elevational view of the calculating machine;

Figure 5 is a perspective view of one of the parts;

Figure 6 is a perspective view of one of the small assemblies of the machine;

Figure 7 is a fragmentary plan view of the right end of the carriage with the cover removed;

Figure 8 is a sectional view of a portion of the tabulator mechanism taken in a plane indicated by the line 8—8 in Figure 7;

Figure 9 is a sectional elevation of certain of the control keys taken as indicated by the line 9—9 in Figure 1;

Figures 10 and 11, form together a side elevational view of the machine illustrating certain of the controlling parts of the mechanism;

Figures 12 and 13, taken together, show a sectional elevational view of the machine taken in a plane indicated by the line 12—12 in Figure 1;

Figures 14 and 15 show a sectional elevation through the machine taken in a plane indicated by the line 14—14 in Figure 4;

Figure 16 is a sectional view of certain of the parts shown schematically, the view being taken as indicated by the line 16—16 in Figure 4;

Figure 17 is a view similar to Figure 16 but showing certain of the parts in operated position.

The invention is disclosed as embodied in a calculating machine having actuating mechanism of the uni-directional, continuous drive cycle type wherein all power driven operations are effected by engagement and disengagement of a single clutch providing the only path of power flow from the motor of the machine to the motor driven parts thereof. Calculating machines of this construction are disclosed in the patent to Carl M. Friden, No. 2,310,281, which issued February 9, 1943, and the application of Carl M. Friden and Anthony B. Machado, Ser. No. 315,986, filed January 27, 1940.

The frame of the machine includes a base 10 (Figures 1, 2 and 3) on which left and right side frame plates 12 and 13 are mounted within casing 11. Side plates 12 and 13 may be connected by cross brackets 16, 17, 18 and 19 which serve to support various mechanisms of the machine. The register carriage 22 (Figures 1 and 2) which supports the accumulator and the revolutions counter is mounted on the frame brackets 16 and 19 by rollers 23 for endwise shifting movement laterally of the machine in either direction to various ordinal positions as controlled by means described hereinafter.

Carriage 22 (Figure 2) includes a frame 31 in which numeral wheel shafts 32 are journaled to carry numeral wheels 33 of conventional construction. Numeral wheels 33 have projecting twirler knobs 34 for manual setting thereof. To transmit increments of value to numeral wheels 33, each shaft 32 extends below the frame 31 and has a ten-tooth gear 35 which is actuated by means later described.

Accumulator resetting means

Means are provided on the carriage for resetting the numeral wheels 33 (Figure 2) to zero registration including means such as a rack bar 41 mounted for endwise sliding movement in the carriage frame adjacent the upper end of the numeral wheel shafts 32 for cooperation with multilated gears 42 carried by numeral wheel shafts 32. Adjacent gears 42 are axially offset to cooperate with the adjacent vertically offset racks formed on rack bar 41 in the usual manner. When rack bar 41 is moved from its normal position to which it is spring urged in the usual manner, it will engage the gear 42 of a numeral wheel 33 displaced from the zero position and reset the numeral wheel to such position. Rack 41 carries a handle 44 (Figures 1 and 7) for manual operation, and may be connected to an actuating bar or slide 43 for power operation. Bar 43 is suitably mounted for sliding movement on the frame 31 and may be selectively coupled with rack bar 41 by means of interponent arm 46 (Figure 7) which is carried by handle 44. Handle 44 is adjustable about an upright axis to control the engagement of arm 46 with the end of a lever 54 pivoted at 55 on bar 43. Lever 54 is urged in a counterclockwise direction by spring 56 for a purpose later described. This mechanism is of the general character of that disclosed and claimed in the copending application of Carl M. Friden, Ser. No. 240,269, filed November 14, 1938, now Patent No. 2,294,083, issued August 25, 1942.

Drive, selecting and actuating mechanisms

The values to be introduced into numeral wheels 33 are selected by means of a plurality of banks or orders of settable value keys 61 (Figures 1 and 2) of conventional construction. Keys 61 are mounted for endwise sliding movement and are adapted to be latched in depressed position by a latching bar 62 associated with each bank of keys 61 and adapted to be operated to release a depressed key by zero key 63 in each order. All of the orders of keys can be released simultaneously by the operation of a key releasing gate 64 (Figure 15) which extends along the front ends of latching bars 62 in the usual fashion. Gate 64 is operable through link 65 and bellcrank 66 by means of keyboard release or clear key 67 in the usual manner.

The keys 61 (Figure 2) cooperate with selecting mechanism including spring urged selecting slides 68 mounted for endwise movement to position gears 69 selectively with respect to the stepped teeth of the associated actuating cylinders 70. Cylinders 70 for adjacent orders are mounted on actuating shafts 71 (Figures 2 and 3) having suitable bevel gear connections with a transverse drive shaft 72 which is suitably journaled in side plates 12 and 13.

Shaft 72 and shafts 71 are driven cyclically from motor 73 through clutch 74 (Figures 3 and 12) which may be driven by suitable gearing 75 from the motor shaft 76. Clutch 74 may be engaged or disengaged by oscillation of spring urged clutch pawl or dog 77 (Figure 12) mounted for rotation with shaft 72 and with respect to ratchet 78 journaled on shaft 72 and driven by gearing 75. Clutch control lever 79 is pivoted on side plate 13 to determine engagement or disengagement of the clutch by releasing or engaging the nose of dog 77 in the full cycle position thereon.

The number of increments transmitted to a gear 69 (Fig. 2) by a cylinder 70 during cyclic operation of the clutch is transmitted to a square shaft 81 which carries each ordinal pair of gears 69 and extends rearwardly of the machine in the usual manner. Each shaft 81 carries a spool 82 having bevel gears 83 and 84 for cooperation with the aligned numeral wheel gear 35.

The engagement of gears 83 (Figure 2) and 84 with gears 35 is controlled by strap 86 positioned between the gears and mounted by suitable arms 85 for rocking movement with shaft 87. Thus, rocking of shaft 87 determines transmission of said increments to the numeral wheels and also the direction of entering thereon. Any suitable control means such as plus key 88 (Figure 1) and minus key 89 may be provided for rocking the shaft 87 to cause positive and negative registration. Shaft 87 may be centralized by a pair of spring urged centralizing arms 91 (Figure 2) cooperating with a central stop 92 and engaging a pin 93 carried by one of arms 85.

Revolutions counter mechanism

The revolutions counter may comprise numeral wheels 51 (Figures 2 and 7) on shafts 52 which may be re-set to zero by rack bar 53 similar to rack bar 41 described above. Rack bar 53 carries handle 48 (Figure 1) for manual operation and may be connected to extension 49 of actuating bar 43 by interponent 46a which is connected to handle 48 for swinging adjustment thereby. Interponent 46a is adapted to cooperate with pin 47 to provide a driving connection from actuating bar 43 to bar 53.

The numeral wheels 51 (Figure 2) are actuated by means of a conventional actuator 57 mounted on a shaft 58 which is rocked from drive shaft 72 through a spring connection in a clockwise direction from the position shown in Figure 2 into operative engagement with the aligned numeral wheel 51, and then is translated axially to effect entry of the digit. When no count is to be made, the clockwise rocking movement may be restrained by means of a neutralizing finger 59 (Figure 14) carried by a slide 60 guided on cross bracket 17 and pivotally connected to plus-minus gate or strap 86 to be controlled thereby. In the central neutral position of strap 86, finger 59 underlies arm 51a of the counter actuator and thereby blocks rocking movement thereof.

Carriage shift mechanism

The carriage can be shifted selectively in either direction by power driven means controlled by manually operable keys, and this mechanism is of conventional construction. Carriage 22 is provided with toothed shift rack 101 (Figures 2 and 4) along the rear side thereof for cooperation with opposite shift pins 102 on shift gear 103. Shift gear 103 can be rotated in either direction and receives one-half rotation for each rotation of the clutch referred to above. For this purpose the shift gear 103 (Figures 3 and 4) is connected by suitable gearing 104 to respective gear sleeves 106, 107, the gearing being arranged so that the drive from gear sleeve 106 rotates gear 103 in one direction, and the drive from gear sleeve 107 rotates gear 103 in the other direction. The respective gear sleeves 106, 107 (Figure 3) are slotted for engagement by toothed collars 108, 109 mounted slidably but non-rotatably on the rearward ends of a pair of adjacent actuating shafts 71.

The sliding movement of collars 108, 109 (Figures 3 and 4) is controlled through forks 110 by means of spring-urged rods 111, 112 which extend forwardly of the machine and abut similar depending arms 113, 114 carried by shaft 116 and sleeve 117 mounted thereon. Adjacent side plate 13 (Figures 3 and 14) shaft 116 and sleeve 117 have upstanding arms 118 and 119 operated by suitable rollers on shift keys 121 and 122 so that selective depression of the keys controls the direction of carriage shifting.

To enable the power drive, shift keys 121 and 122 (Figure 12) have respective pins 123 cooperating with lever 124 operatively connected by lever 126 to control contacts 127 of the motor drive, and connected by link 128 with clutch control lever 79. Thus, upon depression of either of keys 121 or 122, the clutch is engaged and the motor circuit enabled.

From the foregoing it is seen that the carriage can be shifted selectively in either direction.

Return-clear control

As previously explained, the operation of actuating bar 43 for the accumulator and counter resetting means can be effected by power, and these resetting or clearing operations are preferably preceded by a return of the register carriage to one of its end positions. The combined carriage shifting and resetting operations are preferably controlled and brought into play by return clear key 141.

Return clear key 141 (Figure 13) is mounted for endwise sliding movement on side plate 13 by means of respective pins 142 engaging endwise slots in the key. Key 141 is suitably spring-urged to the raised position shown in Figure 13. Intermediate its ends, the key 141 is provided with an aperture 143 in which is disposed the pin 144 carried by a bellcrank 146 pivoted at 147 on side plate 13. The lower end of bellcrank 146 is connected by a link 148 (Figures 12 and 13) with an arm 149 pivoted at 151 on the side plate. Arm 149 is also connected by link 152 with a bellcrank 153 mounted on transverse shaft 154 (Figures 2, 4, and 12).

As described presently, rocking of shaft 154 by depression of key 141 serves to enable the shift to the leftmost carriage position to enable the power clearance mechanism and to engage the clutch and close the motor circuit.

Shaft 154, key 141, and the parts controlled thereby are maintained in operative position by a suitable latch. As seen in Figure 13, key 141 is provided at its lower end with latching tooth 156 for engagement by the offset end 157 of a latching slide 158 (Figures 12 and 13). Latching slide 158 is slotted to engage guide pin 159 and at its rearward end is connected to a lever 161 pivoted on transverse pin 162. Spring 163 urges latching slide 158 to the right as viewed in Figures 12 and 13 so that upon depression of key 141 tooth 157 engages over the latching tooth 156 of the key. Lever 161 (Figure 12) is pivotally connected at its upper end to a link 164 which extends upwardly and is pivotally connected at 166 to the latch releasing arm 167 which is operated near the end of the power clearance operation as later described to release the latch for key 141 when it is restored to raised position.

As previously explained, the rocking of shaft 154 serves to engage the left-hand carriage shift mechanism and the power clearance mechanism. Referring to Figure 2, shaft 154 carries an upstanding arm 171 having a pusher link 172 adjustably pivoted thereon at 173. Pusher link 172 is urged in a clockwise direction by a spring 174 also connected to arm 171 to urge this arm in a counter-clockwise direction whereby through the associated linkage key 141 is resiliently urged to its raised position.

Pusher link 172 (Figure 2) carries a pin 176 cooperatively related with depending arm 177 secured on a transverse shaft 116. Shaft 116 as previously described, carries depending arm 113 (Figure 3) which abuts the end of shift control rod 111 for the shift drive connection to the left.

To enable the power driven resetting mechanism, pusher link 172 (Figures 2 and 3) is provided with an offset notched end 178 in operative pushing engagement with the end of control rod 179 for the power clearance drive. This engagement is maintained by the tension of spring 174. As seen in Figures 2 and 3, rod 179 extends rearwardly and carries control fork 181 for shiftable drive establishing collar 182 having a slidable but non-rotatable driving engagement with one of actuating shafts 71. Collar 182 is toothed for engagement with the slotted hub 183 of cam 184 (Figures 2, 3, and 4).

As seen in Figure 4, cam 184 is operatively related with arm 186 to drive actuating slide 187 for power resetting, which in the leftmost position of the carriage is operatively related to arm 188 carried by actuating bar 43. The above described mechanism forms part of a conventional power return clearance mechanism as described in said application, Ser. No. 240,269.

Depression of key 141 also engages the clutch and enables the motor circuit through the rocking of shaft 154. Shaft 154 (Figure 14) carries the depending arm 191 having a pin 192 adapted to rock an arm 193 pivoted at 194 on side plate 13. Arm 193 has an upstanding finger 196 operatively related with roller 197 carried at the lower end of lever 126. Thus upon depression of key 141, lever 126 will be rocked in a counterclockwise direction as viewed in Figure 12 to close the motor circuit contact and to move clutch control lever 79 to clutch engaging position.

To release the latched key 141 at the end of the return-clearing operation, the over-rotation of shift pins 102 during the resetting operation is utilized. During the clearing cycle one of shift pins 102 is engaged in the endmost tooth space of shift rack 101 which is formed in part by pawl 201 pivoted at 202 on the rack and urged against pin 203 by spring 204. One of the shift pins 102 rotating in a clockwise direction during the clearing cycle serves to operate pawl 201 and move it downwardly to engage with the end 206 of L-shaped lever 207 pivoted at 208 on plate 16. Lever 207 is spring-urged upwardly by spring 207a. End 206 carries an ear 209 overlying an extending ear 210 of lever 167 so that this lever is moved downwardly and through link 164 and lever 161 serves to move latch slide 158 to release the depressed key.

To disable one of the functions of lever 207 upon its depression, key 141 carries a roller 211 overlying a lever 212 (Figures 12 and 13) pivoted on pin 159 and connected to link 213 which extends rearwardly (Figure 12 and 14) and is guided at its rearward end by pin 214. Link 213 carries a pin 216 engaging in the slotted lower end of a link 217 which for a purpose later described overlies a pin 218. Upon depression of key 141, link 213 is moved to the right as viewed in Figure 14 to move link 217 off of the pin 218 to disable this connection as later explained in detail.

Tabulation and dividend entry

The tabulating and dividend entering mechanism of the instant invention operates to zeroize the registers as a preliminary to a division operation, and to effect entry of the dividend into the accumulator in any selected ordinal position which may be pre-set in accordance with the problem being solved, while suppressing the usual count made in the revolutions counter during entry of a number in the accumulator. After setting of the dividend into the keyboard, the only other operation necessary is the depression of the dividend control means or key, after which the machine automatically operates to perform the above described functions, the desired ordinal position of the carriage upon entry of the dividend having been pre-set in accordance with the number of quotient figures desired, or the desired position of the decimal point in the quotient.

In the embodiment of the invention selected for illustration, the first operation which occurs upon depression of the dividend key is a shifting of the carriage to its leftmost position if displaced therefrom for a power clearance operation.

*Dividend key.*—Referring to Figures 1 and 12, a dividend key 221 is mounted for endwise sliding movement on side plate 13 by means of pin 222 engaging a slot therein. Spring 223 urges key 221 to the raised position shown in Figure 12. The lower end of key 221 is provided with elongated slot 224 which is engaged by pin 226 carried at the end of lever 153 mounted on transverse shaft 154.

Intermediate its ends, key 221 (Figure 12) is provided with latching face 231 for engagement by the latching end of a latch slide 232 mounted for endwise sliding movement on side plate 13 with its rear end pivotally supported on upstanding pivotally mounted arm 233. Spring 234 is associated with arm 233 to urge slide 232 to latching position. Thus, upon depression of key 221 it is latched in depressed position, and it remains there until the end of the operation when unlatching occurs by means described later.

Depression of key 221 serves to enable a shift of the carriage to the left, to enable a power clearance mechanism, to condition the shift to the right, to block out the counter actuator, and to enable the drive.

The shift of the carriage to the left, the power clearance mechanism for the registers, and the enabling of the drive are determined when depression of key 221 (Figure 12) operates through lever 153 to rock the shaft 154 which operates in the manner previously described. It will be noted that the slot 224 in key 221 engaging pin 226 is of sufficient length to allow movement of lever 153 independently of key 221. Correspondingly, aperture 143 (Figure 13) in key 141 also allows independent idle movement of bellcrank 146 upon depression of key 221.

As previously stated, depression of the dividend key 221 also serves to block out the counter actuator and prevent operation thereof, and to condition the shift mechanism for shifting to the right at the end of the return-clear operation.

As seen in Figures 12 and 14, the lower end of dividend key 221 is engaged in its uppermost position with a roller 241 carried by lever 242, pivoted at 243 on side plate 13. Lever 242 (Figure 14) carries a roller 244 operatively disposed beneath the forwardly extending arm 245 of a bellcrank 246 pivoted on shaft 247, which is suitably mounted on side plate 13. The movement of bellcrank 246 is utilized to block the counter actuator from operation and also to condition the shift mechanism for shifting the carriage to the right at the end of the return-clear operation.

In order to block out the operation of the counter actuator by movement of the bellcrank 246 (Figure 14), the upright arm 248 of the bellcrank 246 carries a pin 249 operatively engaged with lever 250, pivoted at 251 on side plate 13. The upper end of lever 250 is pivotally connected at 252 with blocking slide 253 having projection 254 lying normally out of the path of oscillation of arm 57a of the counter actuator assembly. Counter-clockwise rocking movement of bellcrank 246 operates through lever 250 to move the slide 253 and projection 254 thereof to the right from the position shown in Figure 14 to place projection 254 in the path of arm 57a so that movement of the counter actuator to active position is prevented as previously explained in connection with neutralizer slide 60. Spring 255 aids gravity in restoring lever 250, slide 253 and bellcrank 246 to inactive position at the end of the operation.

In order to condition the shifting mechanism for tabulation to the right, arm 256 (Figure 16) is formed integrally with bellcrank 246 and is pivotally connected at 257 to a link 258 extending rearwardly and riding on roller 259 on an arm 261 also pivoted on shaft 247. Arm 261 has an arm 263 pivoted thereon and is connected thereto by spring 262 so that arm 263 is biased to move with arm 261. Shift engaging arm 263 has a curved upper end 264 operatively engaged with shift controlling fork 110 of the right hand shifting mechanism. Link 258 is adapted to be disposed between the roller 259 and lever 207 (Figures 4 and 16).

In order to establish a driving relation between the lever 207 and arm 261, link 258 is provided with a projection 266 which normally is disposed out of the path of the lever 207, as shown in Figure 16, but is moved into the position shown in Figure 17 upon depression of the dividend key, so that when the lever 207 is subsequently depressed, as later described, arm 261 is rocked to operate through spring 262 (Figure 17) to place a bias on arm 263 to engage the shift clutch for determining shifting or tabulation to the right as later described.

Thus, upon depression of the dividend key 221, the first operation which ensues is a shifting of the carriage to its leftmost position if displaced therefrom, where a clearing or resetting operation is performed on either or both the accumulator and counter. The clearing of the registers occurs during a cycle of operation with the carriage in its leftmost position, as shown in Figure 4, where one of shift pins 102 is engaged in the endmost tooth space of shift rack 101 against pawl 201. With the carriage in the position shown, shift pin 102 during the clearing cycle, rotating in a clockwise direction serves to oscillate pawl 201 so that it strikes end 206 of lever 207, and moves it downwardly, and this movement is utilized to initiate shifting of the carriage to the right to the selected position for entering the dividend.

At the beginning of the clear cycle interponent arm 258 has its projection 266 disposed between the lever 207 and roller 259 on shift conditioning arm 261. Thus, when pawl 201 is actuated, lever 207 is depressed from the position shown in Figure 16 to that shown in Figure 17, when lever 261 operates through spring 262 to place tension on shift engaging arm 263. The movement of shift engaging arm 263 from the position shown in full lines in Figure 17 to that shown in dotted lines is delayed until the end of the cycle by interlock means associated with the shift engaging mechanism.

Referring to Figures 3 and 4, the interlock means comprises lever 271, pivoted at 272 on a suitable bracket carried by rear frame bracket 16, and having a pair of upstanding pins 273 spaced from and disposed in the path of respective shift forks 110 carried by rods 111 and 112. As seen in Figure 3, when one shift fork is moved rearwardly to engage the corresponding shift drive connection, the opposite pin 273 moves into blocking engagement with the other shift fork 110 to prevent operative movement thereof until the other shift drive is disengaged. Inasmuch as the shift drive for determining shifting to the left remains engaged until rocking of pawl 201 during the clear cycle, initiation of the shift to the right by movement of shift rod 112 by the hooked end 264 of arm 263 cannot occur until the end of the resetting cycle.

During the resetting cycle, certain other conditionings are effected in the machine. As seen in Figures 4, 6, and 14, arm 261 has integrally formed therewith a bellcrank 276 and both arm 261 and bellcrank 276 are urged to the position shown in Figure 16 by spring 277 attached to arm 261 and to the frame. The movement of the bellcrank 276 with arm 261 from the position shown in Figure 16 to that shown in Figure 17 is utilized to condition the control for entering the dividend at the end of the shifting operation to the right, and for maintaining the shift engaged until the selected tabulated position is reached.

To latch the bellcrank 276 and arm 261 in the position shown in Figure 17, the lower horizontal arm of bellcrank 276 is provided with laterally extending ear 278 adapted for engagement with a seat in a latch lever 279, pivoted at 281 on side plate 13, and urged in a clockwise direction by spring 282. As shown in Figure 17, upon clockwise movement of arm 261 and bellcrank 276, they are latched in position by latch lever 279.

The movement of bellcrank 276 also serves to condition means for engaging the plus-minus gears to enter the dividend at the end of the shift operation. For this purpose the upper arm of bellcrank 276 (Figure 14) is pivotally connected to a link 286 which is pivotally connected at 287 with a depending arm 288 pivoted to an actuating slide 289 mounted for vertical sliding movement on side plate 13, by slotted engagement with respective pins 291. As shown in Figure 14, depending arm 288 is normally to one side of an ear 292 of a latching bell-crank 293 which serves to determine engagement of the plus-minus gears for entry of the dividend. As shown in Figure 17, arm 288 is operatively related to ear 292 so that downward movement of slide 289 will release latch lever 293 as later described.

The movement of lever 207 and end 206 thereof during the resetting operation also determines release of the shift connection determining shifting to the left. For this purpose bellcrank 299 (Figure 14) is pivoted on shaft 87 and has an arm disposed beneath lever 207. The depending arm of bellcrank 299 is pivotally connected to link 301, having its forward end pivotally connected to depending arm 302 secured on transverse shaft 303 (Figures 3 and 14). Shaft 303 (Figures 2 and 3) carries an arm 304 which is slotted at its offset end to receive pusher link 172. Thus, counter-clockwise movement of the bellcrank 299, as viewed in Figure 14, moves link 301 forwardly to rock shaft 303 in a counter-clockwise direction (a clockwise direction as viewed in Figure 2) so that arm 304 lifts pusher link 172 against the urgency of spring 174 to move end 178 thereof out of engagement with push rod 179 for the clear mechanism, and to disengage pin 176 from arm 177 of the control means for determining shifting to the left. In this manner, both the shift connection for left hand shifting and the drive connection for resetting are disabled during the cycle performing the resetting operation so that they can be disengaged near the end of such cycle.

*Tabulation control*

It will be recalled that when the right hand shift mechanism is acting as shown in Figure 17 by the dotted line position of shift control fork 110, the control linkage therefor is latched in operative position by the engagement of latch 279 with bellcrank 276, and also that slide 289 is in operative position to actuate latch 279 to release bellcrank 276. A tabulation control is provided for effecting this release selectively in any shifted position of the carriage.

As seen in Figures 1, 2, and 8, the carriage 22 is provided with a series of tabulator keys 311, numbered 0 and 2 to 10 in accordance with the position of the carriage. In the first or leftmost position of the carriage zero tabulator key 312 is aligned with arrow 313 on the casing of the machine. Tabulator keys 311, 312 (Figures 2 and 8) are mounted for vertical endwise movement in broached slots in carriage frame bar 314, and keys 311 can be latched in depressed position by spring urged latching slide 316, which is adapted to engage over the tooth 317 of a depressed key. Zero key 312 provides a release key for any depressed key 311 which it may be desired to release in changing the setting of the machine to cause positioning of the carriage in its rightmost position. In alignment with the "10" key 311 (Figure 14) a beveled fix cam (not shown) is provided which operates arm 322 irrespective of the depression of "10" key 311. Thus "10" key 311 is a dummy key provided merely for the operator's convenience. Latching slide 316 is maintained in position in the frame bar 314 by retaining bracket 318. Keys 311 and 312 are urged to their raised positions by respective springs 319 associated therewith.

A depressed key 311 as indicated in dotted lines in Figure 8, is adapted to engage a V-shaped laterally extending ear 320 of an arm 322 pivoted at 323 on frame bracket 19. As shown in Figure 8, in the leftmost position of the carriage, release key 312 is aligned with the extension 320, and correspondingly if the carriage is displaced one or more ordinal spaces from its leftmost position, the corresponding key 311 will engage the nose 320 and depress the arm 322. Adjacent its end, arm 322 (Figures 8 and 14) carries roller 324 which is disposed above the upper end of actuating slide 289. Thus, when the carriage shifts into a predetermined position, the actuating slide 289 is operated to move latch 279 from the position shown in Figure 17 to that shown in Figure 16, to release bellcrank 276 and arm 261 and thereby permit disengagement of the shift mechanism for shifting the carriage to the right. This operation will occur toward the end of the last shift cycle.

The downward movement of actuating slide 289 as the carriage enters its selected position also serves to release spring actuated means for meshing the plus-minus gears, and for releasing the dividend key. The downward movement of slide 289 (Figure 17) acts through interponent arm 288 which was operatively positioned by link 286 when bellcrank 276 was latched to rock latching bellcrank 293 in a counter-clockwise direction and thereby move its latching notch 331 (Figure 12) out of the path of offset ear 332 of a bellcrank 333, pivoted on pin 334 extending between side plate 13 and bracket 335 on plate 336 (Figure 10). Bellcrank 333 is urged in a counterclockwise direction by a relatively strong spring 337 and has its upper end formed as a cam nose for operative engagement with roller 338 carried at the lower end of a lever 339 (Figures 4 and 12) having a hub 340 journalled on shaft 87. Hub 340 has a releasable clutch connection with collar 341 secured on shaft 87, and the clutch connection is maintained normally engaged by spring 342. As seen in Figure 12, the cam nose of bellcrank 333 is spaced from roller 338 in the neutral position thereof to permit normal movement of shaft 87 and lever 339 therewith during registration of a negative character. Upon release of bellcrank 333, the cam nose thereof becomes effective to rock lever 339 and shaft 87 in a clockwise direction, and thereby mesh gears 83 with numeral wheel gears 35 (Figure 2) to determine a positive registration therein during the dividend entering cycle, when the amount set up in the keyboard will be entered as the dividend in the selected tabulated position of the carriage.

Movement of lever 339 also serves to actuate latch slide 232 (Figure 12) and thereby release the dividend key. It will be recalled that the dividend key serves to hold counter blocking slide in active position, and means is brought into play to prevent movement of counter blocking slide 253 out of active position when the key is released. For this purpose the offset ear 332 (Figure 14) of bellcrank 333 moves downwardly in front of offset ear 343 on lever 250 and maintains slide 253 in blocking relation with the counter actuator during entering of the dividend.

The movement of bellcrank 333 which initiates the dividend entering operation also enables means for restoring such bellcrank to inoperative position. As shown in Figure 10, the lower end of bellcrank 333 is connected by link 346 with an arm 347 pivoted on plate 336 and having its upper end normally disposed out of the path of a roller 348, carried by a gear 349 on the end of transverse shaft 72. However, counterclockwise movement of bellcrank 333 serves through link 346 to move arm 347 into the path of roller 348, so that near the end of the dividend entering cycle of operation after entry of the dividend into the accumulator, roller 348 rocks arm 347, and through link 346 oscillates bellcrank 333 in a clockwise direction so that latch 293 can again move to active position as shown in Figure 12. The return of bellcrank 333 also moves tooth 332 thereof out of engagement with tooth 343 so that lever 250 and link 253 can return to inactive position, as shown in Figure 14. Lever 250 and link 253 are returned to their Figure 14 position by the action of gravity and spring 255.

To maintain the drive through the dividend entering cycle, the upper end of arm 347 (Figure 10) has pin 351 engaging the slotted end of a link 352 pivoted at 353 in link 128 (Figure 12) of the drive controlling linkage. When arm 347 is moved clockwise (Figure 10) to active position, pin 351 thereon moves to the end of the slot in link 352 to maintain the clutch and circuit controlling parts in active position.

The above described dividend entering and tabulating mechanism is of the general character disclosed in said application Ser. No. 315,986, filed January 27, 1940, for "Calculating machine."

Counter clear and tabulation

As previously stated, the instant invention includes the provision of means for initiating a clearing and tabulating operation whereby the revolutions counter alone is cleared and the carriage is positioned in a pre-selected position for subsequent operations.

In order to accomplish the above result, a manually operable key is provided which upon operation brings into play the return clear mechanism referred to above, conditions the tabulating mechanism for a shift to the right after the return clear operation, disables the dividend entry means of the tabulating mechanism, and disables the accumulator resetting means.

Referring to Figures 9, 10 and 11, the manually operable control means comprises key 361 which is mounted for endwise sliding movement by slots therein engaging on respective studs 142. Key 361 is spring-urged to its raised position as shown in Figure 11 and when depressed is adapted to be latched in depressed position by virtue of its offset lug 363 being engaged by spring urged latching slide 364. Slide 364 is mounted for endwise sliding movement by engagement with stud 159 and pin 367 on arm 347. Spring 368 urges slide 364 to latching position and the slide is moved to unlatching position by the operation of arm 347 as will be later explained.

As stated above, upon depression of key 361, the clutch is engaged and the return clear mechanism is brought into operation. For this purpose, bellcrank 146 is provided with a pin 369 which engages in an aperture 371 within key 361 so that the clutch is engaged and the return clear mechanism brought into operation in the same manner for key 361 as for key 141 of the return clear mechanism.

To condition the right hand shift means for tabulating operation, to disable the dividend entering means usually associated with the tabulating mechanism, and to disable the accumulator resetting means, key 361 is provided with a roller 372 (Figure 11) acting upon a bellcrank 373 (Figures 10 and 11) pivoted at 374 and having a pivotal connection at its opposite end (Figure 10) with rearwardly extending link 376. Link 376 is spring-urged in a direction to maintain key 361 in raised position by spring 377. At its rearward end, link 376 is pivotally connected at 378 with an upstanding arm 379 of a bail 381 (Figures 4 and 10) which is pivotally mounted on shaft 162.

In order to enable the right hand tabulating shift mechanism, one arm of bail 381 (Figures 4 and 17) is provided with a roller 383 lying under an extension 384 of arm 256. As previously explained, the arm 256 carries interponent member 258 which, when moved to position shown in Figure 17 during the resetting cycle will throw in and latch the right hand shift mechanism until it is subsequently disabled in the tabulated order by virtue of the tabulating key which is depressed.

In order to disable the dividend entering mechanism, the bail 381 (Figures 4, 10 and 12) is provided with an ear 386 which lies over the upper edge of a bail 387. Bail 387 is of the character disclosed in said application, Ser. No. 315,986, and is operated upon setting of a suitable control lever to oscillate its arm 388 (Figures 4 and 10) carrying roller 389. Roller 389 engages the lower cam end of a lever 391 pivoted at 392 and having a pin 393 at its upper end. Pin 393 is in cooperative relation with lever 339 to move it outwardly against the energy of spring 342 to disengage hub 340 from collar 341. In this way, the movement of lever 339 which would otherwise engage the plus-minus gears is disabled.

In order to disable the accumulator resetting means, the bail 381 (Figures 4 and 14) carries the roller 218 which as previously described is in operative engagement with link 217. Link 217 is pivoted at 395 to a slide 396 mounted for endwise sliding movement on rear bracket 16. When slide 396 is moved upwardly from the position shown in Figures 4 and 14, it is adapted to engage a cam pin 397 carried on a bail 398 pivoted at 399 on bracket 401 secured to the carriage frame 31. Slide 396 and cam pin 397 are aligned with the carriage in its leftmost position and the upper end of slide 396 is provided with an inclined cam face 402 for engagement with the pin 397 as the carriage enters its leftmost position. The upper end of bail 398 (Figure 14) lies behind a pin 403 (Figures 4, 7 and 14) depending from spring-urged lever 54. As previously described, lever 54 provides the releasable connection between the resetting rack bar 41 of the accumulator and the actuating bar 43 therefor.

Thus upon depression of the counter clear key 361, the mechanism is brought into operation to position the carriage in a selected tabulated position with the counter reset to zero but with the accumulator at its original setting. In this way, products or items can be accumulated while individual multipliers or numbers of item entries are entered successively in the counter.

If the counter clear key 361 and the return clear key 141 are depressed simultaneously, the return clear key moves link 217 off pin 218. As previously described the return clear key 141 (Fig. 13) by means of a roller 211 rocks a lever 212 (Fig. 12) which moves the link 213 forwardly. The link 213 at its rear end (Fig. 14) has a pin 216 by which it swings the depending link 217 on its pivot to disconnect it from the pin 218 so that when the return clear key 141 and the key 361 are depressed simultaneously, the slide 396 is not elevated and the accumulator is cleared. In this type of control, the carriage is positioned in the position selected by the depressed tabulating key 311 with both the accumulator and counter reset to zero.

I claim:

1. In a calculating machine having an ordinally shiftable carriage, a pair of registers, at least one of said registers being mounted in said carriage, and resetting means for said registers; a manually operable key, means controlled by said key for causing operation of the resetting means for one of said registers only, means also controlled by said key for preventing operation of the resetting means for the other of said registers, a second manually operable key, a controlling connection from said second key for causing operation of the resetting means for both of said registers, and means controlled by said second key for rendering said preventing means ineffective, whereby upon simultaneous operation of said keys both said registers are reset to zero.

2. In a calculating machine having an ordinally shiftable carriage, an accumulator in said carriage, a revolutions counter, resetting means for said accumulator and said counter, and common power driven means for operating said respective resetting means; a manually operable key, means controlled by said key for causing operation of said power driven means, means also controlled by said key for preventing operation of said accumulator resetting means by said power driven means, control means for said resetting and power driven means including a second manually operable key, and means controlled by said second key disabling the control of said first key over said accumulator resetting means, whereby upon simultaneous operation of said keys both said accumulator and said counter are set to zero.

3. In a calculating machine, a pair of registers, resetting means for each of said registers, a common drive member for operating said resetting means, the drive connection from said member to the resetting means of one of said registers including an element yieldably urged to active position, a control key, and means operated by said key upon manipulation thereof for causing operation of said member and for moving said element to inactive position.

4. In a calculating machine, a pair of registers, resetting means for each of said registers, a common drive member for operating said resetting means, the drive connection from said member to the resetting means of one of said registers including an element yieldably urged to active position, a control key, means operated by said key upon manipulation thereof for causing operation of said member and for moving said element to inactive position, a second control key, means controlled by said control key for causing operation of said member, and means also controlled by said second control key for rendering said moving means ineffective.

5. In a calculating machine, a frame, an ordinally shiftable carriage on said frame, a pair of registers in said carriage, resetting means for each of said registers, a common drive member carried by said carriage for operating said resetting means, the drive connection from said member to the resetting means of one of said registers including an element yieldably urged to active position, a control key on said frame, means operated by said key upon manipulation thereof for causing operation of said member, and means mounted on said frame and controlled by said key for cooperation with said element for moving said element to inactive position.

6. In a calculating machine, a frame, an ordinally shiftable carriage on said frame, a pair of registers in said carriage, resetting means for each of said registers, a common drive member carried by said carriage for operating said resetting means, the drive connection from said member to the resetting means of one of said registers including a pair of adjustable elements, one of said elements being manually settable between active and inactive positions, the other of said elements being yieldably urged to active position, a control key on said frame, means operated by said key upon manipulation thereof for causing operation of said member, and means mounted on said frame and controlled by said key for moving said other element to inactive position.

7. In a calculating machine, a register, resetting means for said register including a resetting rack member mounted for endwise movement to perform the resetting operation, a slide member also mounted for endwise movement parallel to the movement of said rack member, a drive connection between the rack member and the slide member including a manually adjustable arm on one of said members, said arm being settable between active and inactive positions, and a second arm pivotally mounted on the other of said members and spring urged into engagement with said first named arm, machine operation control means including a control key and means controlled by said key for moving said yieldable arm to inactive position and for causing operation of said slide member.

8. In a calculating machine having a keyboard for entering values, a carriage ordinally shiftable relative to said keyboard, an accumulator in said carriage for registering values entered in said keyboard, a counter in said carriage, means for resetting said accumulator, means for resetting said counter, mechanism for returning said carriage to an end position and for actuating both said resetting means, a control for said mechanism, a key for actuating said control, mechanism for tabulating said carriage to a selected ordinal position conditioned by said key, a sequential operation control means for automatically initiating operation of said tabulating mechanism after operation of said resetting means, and means set by said key to render said accumulator resetting means inoperative.

9. In a calculating machine having a keyboard, a register ordinally shiftable relative to said keyboard, an operation control mechanism to facilitate conditioning the machine for calculation, comprising means operable to reset said register to zero, actuating means for said resetting means, an adjustable drive transmitting connection intermediate said actuating means and said resetting means, means for tabulating said register including a plurality of ordinal tabulator keys selectively operable to determine the order to which the register is tabulated, means to shift the register to the selected ordinal position, a control for causing operation of said shift means, means controlled by a selectively operated tabulator key for rendering said control for said shift means inoperative to conclude the tabulation of said register, a key for initiating operation of said operation control mechanism, means set by said key to render inoperative said adjustable drive transmitting connection intermediate said resetting means and said actuating means therefor, and means set by said key to render said control for said shift means operative to cause tabulation of said register.

10. In a calculating machine having a keyboard, a register ordinally shiftable relative to said keyboard, an operation control mechanism to facilitate the performance of problems in division, comprising means operable to reset said register to zero, actuating means for said resetting means, an adjustable drive transmitting connection intermediate said actuating means and said resetting means, means for tabulating said register including a plurality of ordinal tabulator keys selectively operable to determine the order to which the register is tabulated, means to shift the register to the selected ordinal position, a control for causing operation of said shift means, means including an adjustable transmission means for entering a value set on said keyboard in said register, means controlled by a selectively operated tabulator key for rendering said control for said shift means inoperative to conclude the tabulation of said register and to adjust said transmission means to cause entry in said register of the value set in said keyboard, a key for initiating operation of said operation control mechanism, means set by said key to render inoperative said adjustable drive transmitting connection intermediate said resetting means and said actuating means therefor, means set by said key to render said control for said shift means operative to cause tabulation of said register, and means set by said key to suppress entry of a value in said register by preventing said means controlled by a tabulator key from adjusting said transmission means to cause entry in said register.

ANTHONY B. MACHADO.